No. 615,399. Patented Dec. 6, 1898.
J. A. MAIGNEN.
FILTER.
(Application filed June 28, 1898.)

(No Model.) 2 Sheets—Sheet 2.

WITNESSES:
John A. Rennie
P. F. Fogle

INVENTOR
Jean Auguste Maignen.
BY
Diedersheim & Fairbanks
ATTORNEYS.

UNITED STATES PATENT OFFICE.

JEAN AUGUSTE MAIGNEN, OF PHILADELPHIA, PENNSYLVANIA.

FILTER.

SPECIFICATION forming part of Letters Patent No. 615,399, dated December 6, 1898.

Application filed June 28, 1898. Serial No. 684,667. (No model.)

*To all whom it may concern:*

Be it known that I, JEAN AUGUSTE MAIGNEN, a citizen of France, residing in the city and county of Philadelphia, State of Pennsylvania, have invented a new and useful Improvement in Filters, which improvement is fully set forth in the following specification and accompanying drawings.

My invention relates to an improved construction of filter designed particularly for use by armies on the field or in such other places where it is desirable to purify the water taken from streams, pools, and the like for drinking purposes, the same being primarily intended for and especially applicable to my improved filtering organs for which several applications for patents have already been made and are now pending, the object of the present invention being to provide in a simple and inexpensive manner a suitable receptacle wherein the said filtering organ may be conveniently and firmly held against accidental displacement while in transit or while filtering, but from which it may be readily removed, when desired, for cleansing or other purposes.

The invention further contemplates the use of an external casing wherein the receptacle, filtering organ, and its adjuncts may be inclosed, the said casing being utilized when the filter is in operation to receive the filtered water, suitable means being provided whereby the several parts may be securely held in their folded or assembled position during transportation or while being moved from place to place.

It consists of a receptacle, a cage removably arranged within said receptacle and adapted to receive therein the filtering organ, means adjacent said cage to secure the latter in place and prevent a movement or accidental displacement of the filtering organ, an external casing adapted to receive and inclose the receptacle and other parts when in assembled position, and means whereby the several parts are secured together for transportation.

It further consists of the novel features of construction and arrangement of parts, all as will be hereinafter fully described, and pointed out in the appended claims.

Figure 1:
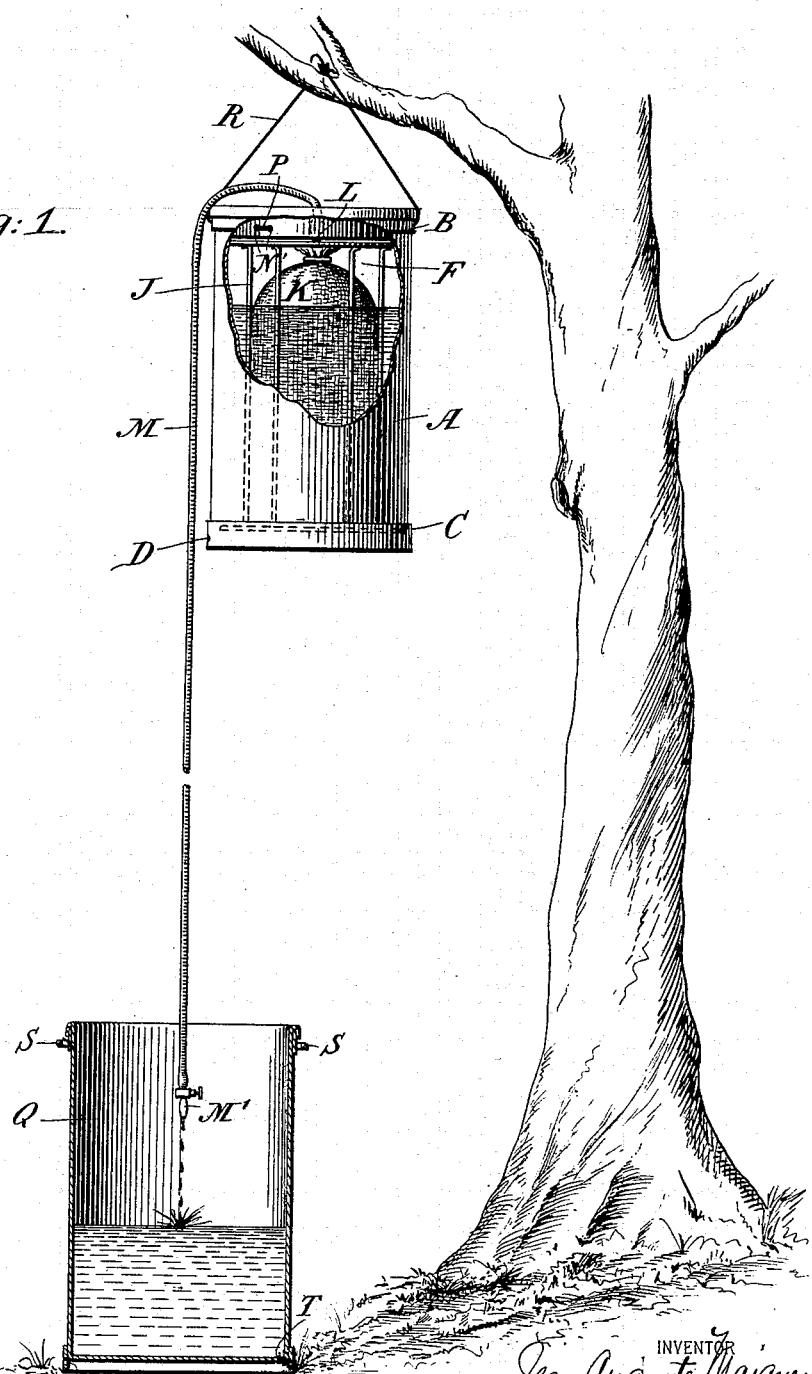
Figure 2:
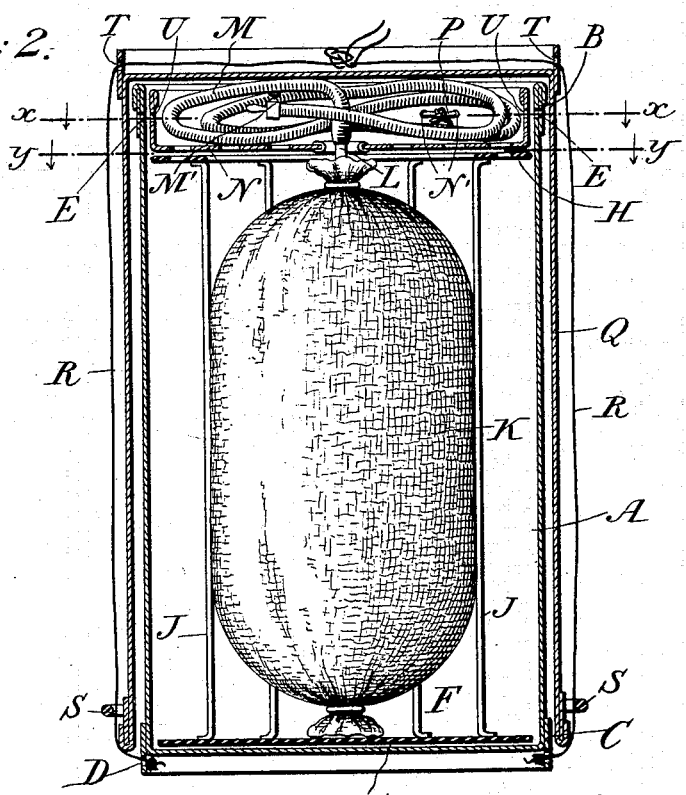
Figure 3:
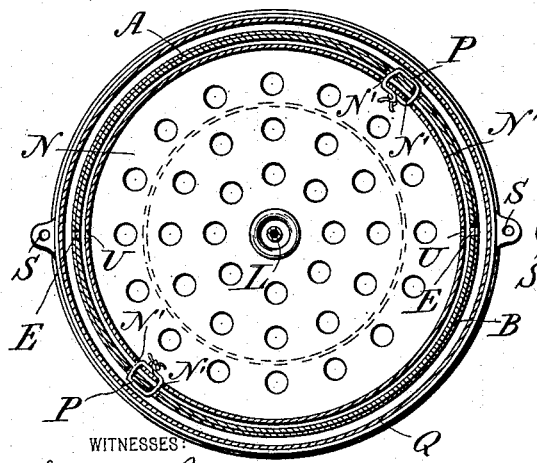
Figure 4:
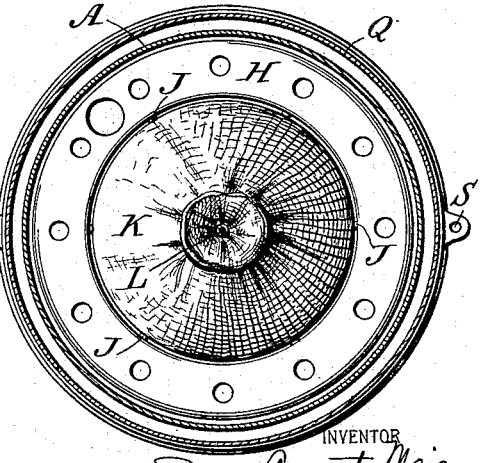

Figure 1 represents a sectional elevation of a filter embodying my invention, the same being shown in actual operation. Fig. 2 represents a similar view showing the several parts assembled and tied, ready for transportation. Figs. 3 and 4 represent transverse sections thereof, taken on the lines $xx$ and $yy$, respectively.

Similar letters of reference indicate corresponding parts in the figures.

Referring to the drawings, A designates the receptacle, preferably, but not necessarily, cylindrical in form, the same being provided at its upper and lower extremities with surrounding bands B and C, respectively, the latter, C, projecting beyond the bottom of the receptacle and being provided with openings D, and the former, B, being arranged near the top of the receptacle, whose upper edge is bent over and upon the said band B, thus serving to strengthen the same at that point. Similar openings E are made in the band B and receptacle A, the same being arranged in substantial alinement with the openings D, referred to, the purposes of which will be hereinafter explained.

F designates a cage composed of a base-plate G and a perforated ring H, secured together by a plurality of interposed rods J, which latter are so arranged as to provide a convenient space between them to receive the filtering organ K, whose exterior surface will bear against the said rods J and so prevent any side movement thereof, as will be obvious.

The filtering organ may be of any desired or preferred construction, and in this instance it is shown as provided with an outlet-pipe L, to which is attached a flexible tube M, which latter when not in use is coiled within a perforated tray N, removably secured within the upper extremity of the receptacle A, adjacent the ring H, cords P or other suitable fastening devices being provided for the purpose, the said cords being passed through perforations N' at opposite sides of the vertical surrounding wall N" of the said tray and similar perforations in the receptacle A and afterward tied, as clearly shown in Figs. 1, 2, and 3. While in its secured position just described, the tray N prevents any longitudinal movement of the filtering organ, as will be clearly evident; but when the fastening devices are released and the tray withdrawn the cage F and the filtering organ K and its adjuncts may readily be removed.

Q designates an exterior casing or cover which is adapted to inclose and cover the receptacle A and the other parts above described when in assembled position, the said casing being placed thereon invertedly, as best seen in Fig. 2, in which position cords R, which have been secured within the openings D, will pass through eyes S, located upon the exterior and at one end of the casing or cover Q and through perforations T, formed in a surrounding projecting band at the opposite end of said casing, the extremities of said cords being tied together, and thus securing the parts in their assembled position ready for transportation.

The operation is as follows: The cords R having been untied and entirely removed and the receptacle withdrawn from the casing or cover Q, the said cords are then passed through the perforations E of the receptacle and corresponding perforations U in the tray N, wherein they are properly held, their extremities being again tied, thus forming a loop or bail by which the receptacle may be suspended from the branch of a tree or other elevated object. The tube M is then uncoiled and placed within the casing Q, which has been previously set in an upright position upon the ground, and the unfiltered water may then be poured into the receptacle A, where it passes down through the perforations in the tray N and through the filtering organ, from whence it siphons through the said tube and governing-cock M' into the said casing Q in a thoroughly-purified state.

It will be obvious from the foregoing that my invention provides in an extremely simple and effective manner a filter which is particularly well adapted for the purposes intended, which can be quickly and compactly assembled and secured in such assembled position for transportation, and which may be speedily set into operative position.

It will also be obvious that the said filter may be used to purify water while the troops are moving, as it is only necessary to provide a simple and crude support upon an army-cart or upon a gun-carriage, &c., whereby the receptacle A may be held at a higher elevation than the casing or cover Q to accomplish the desired result.

Having thus described my invention, what I claim as new, and desire to secure by Letters Patent, is—

1. A filter for the purposes described comprising a receptacle, a cage arranged within said receptacle, said cage consisting of an upper support and a lower plate having connecting devices common thereto, means for securing said cage in position, a filtering organ contained within said cage, an external cover or casing for said receptacle, said casing being closed at one end and open at the other and adapted to receive the filtered water when removed and means for securing said cover thereon while the parts are in assembled position.

2. A filter for the purposes described comprising a receptacle, a cage located within said receptacle, a tray having a bottom provided with perforations through which the water to be filtered is adapted to be poured, said tray being arranged within said receptacle and adjacent said cage, means for securing said tray therein, a filtering organ located within said cage and below said tray, an external cover or casing for said receptacle, and means for securing said cover thereon while the parts are in assembled position.

3. A filter for the purposes described comprising a receptacle having a surrounding band at one end thereof, perforations in said band, and similar perforations at the opposite end of said receptacle, a cage removably secured within said receptacle, a perforated tray arranged above said cage and means for securing said tray in position, a filtering organ, an external cover or casing for said receptacle, and means for securing said cover thereon, while the parts are in assembled position.

4. A filter for the purposes described comprising a receptacle having perforations at one end and a projecting perforated surrounding band at the other end, a cage composed of a base, interposed rods and a perforated ring secured together and arranged within said receptacle, a tray arranged above and adjacent said cage and having perforations in the surrounding wall thereof adapted to register with similar perforations in the receptacle, cords or similar fastening devices for said perforations, whereby the said tray is secured in place, an external casing or cover having eyes at one end thereof and perforations at the other end, and cords adapted to pass through said eyes and perforations and the perforations in the surrounding band of the receptacle, whereby the several parts are held in assembled position.

5. In a filter, a receptacle, a cage contained within the same, said cage consisting of an upper support, and a lower plate, connecting devices common thereto, a tray having a perforated bottom resting on said support, a filtering organ located in said cage, and having a tube or conduit leading therefrom and adapted to be supported in said tray, and means for holding the above parts in assembled position.

6. In a filter, a receptacle, a cage contained within the same, said cage consisting of an upper ring, and a lower plate, connecting devices common thereto, a tray having a perforated bottom supported on said ring, a filtering organ located in said cage, and having a tube or conduit leading therefrom and adapted to be supported in said tray, a casing for said filter, said casing having a closed top and open bottom and adapted to be secured in inverted position to said receptacle, so as to inclose the upper portion thereof, in combination with fastening devices for holding the above parts in assembled position.

JEAN AUGUSTE MAIGNEN.

Witnesses:
JOHN A. WIEDERSHEIM,
WM. C. WIEDERSHEIM.